United States Patent [19]
Feres

[11] Patent Number: 6,045,940
[45] Date of Patent: Apr. 4, 2000

[54] FLOODED LEAD ACID BATTERY WITH TILT-OVER CAPABILITY

[75] Inventor: Fred F. Feres, Rochester Hills, Mich.

[73] Assignee: Exide Corporation, Reading, Pa.

[21] Appl. No.: 09/102,902

[22] Filed: Jun. 23, 1998

[51] Int. Cl.[7] ..................................................... H01M 2/12
[52] U.S. Cl. ................................ 429/84; 429/87; 429/175
[58] Field of Search .................................... 429/72, 73, 82, 429/84, 87–89, 175–177

[56] References Cited

U.S. PATENT DOCUMENTS

| | | | |
|---|---|---|---|
| 4,851,305 | 7/1989 | Kump et al. | 429/84 |
| 5,209,992 | 5/1993 | Feres . | |
| 5,565,282 | 10/1996 | Feres et al. . | |
| 5,683,830 | 11/1997 | Fritts et al. | 429/84 |
| 5,691,076 | 11/1997 | Poe . | |

Primary Examiner—Maria Nuzzolillo
Assistant Examiner—Susy Tsang
Attorney, Agent, or Firm—Nixon & Vanderhye P.C.

[57] ABSTRACT

In a battery configuration including a casing having bottom, side and top surfaces, the top surface having a plurality of cell openings therein, an improved flowpath is provided for liquid electrolyte when the battery is tilted onto any one of its side surfaces. The flowpath includes a cover chamber for each cell opening defined by a substantially rectangular peripheral wall surrounding the cell opening; a cylindrical wall surrounding and substantially concentric with the cell opening and located within the substantially rectangular wall, the cylindrical wall interrupted by a relatively small circumferential gap, and a wall extending between the cylindrical wall and an adjacent side of the peripheral wall, the wall tangential to the cylindrical wall and adjacent the gap.

12 Claims, 5 Drawing Sheets

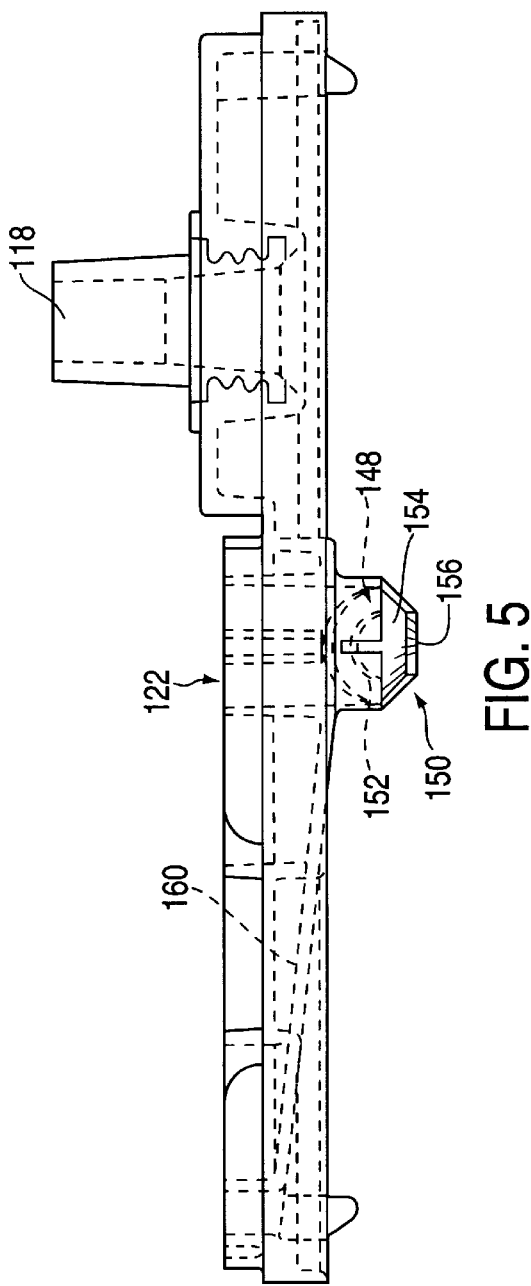
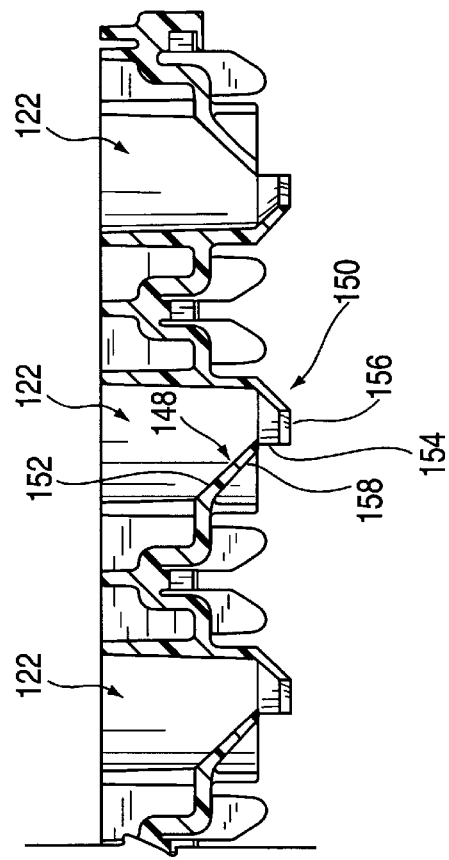

FLOODED LEAD ACID BATTERY WITH TILT-OVER CAPABILITY

TECHNICAL FIELD

This invention relates to lead acid batteries in general, and to improved battery casing cover and vent cover configurations which prevent corrosive acids from being spilled when the battery is tilted over on any of its four sides, or even inverted as the result of mishandling the battery, vehicle accident or the like.

BACKGROUND AND SUMMARY OF THE INVENTION

Flooded lead acid batteries (batteries with liquid electrolyte) designed for starting, lighting and ignition (SLI) experience a variety of rough handling during manufacture, storage and distribution including an occasional accidental tilting of the battery on its side, a variety of angled inclines once the battery is installed within a vehicle, as well as normal vibrations. During normal operation of a battery, water is electrolyzed into hydrogen and oxygen while temperature excursions produce water vapor, both of which will tend to be lost through the battery venting system. A well designed vent network must minimize or prevent this loss by capturing, condensing and draining the acid back into the cells. The vent system must also prevent or minimize spilling even when the battery is inverted, and safeguard the battery against external ignition sources. Typically, the vent system is incorporated into individual cell closures or, in the more modern battery designs, in vent manifold covers which extend over several or all of the cell openings. The vent system usually includes an electrolyte flowpath arrangement in combination with one or more vent recesses or ports in which flame arresters are seated. These flame arresters are usually in the form of glass or polypropylene "frits" which permit the passage of vapor out of the battery casing but prevent flame intrusion into the battery. At the same time, the electrolyte flowpath is designed to minimize spilling, at least when the battery is tilted 90° to one side or the other. See, for example, commonly owned U.S. Pat. No. 5,565,282.

Tougher criteria are currently being implemented, or will be implemented in the future, regarding spillage of electrolyte from flooded lead acid batteries to the extent of requiring spillage prevention even when the battery is turned over, i.e., inverted. Thus, there is a need to have flooded lead acid batteries designed to prevent the spilling of corrosive acids not only when the batteries are subjected to a high degree of tilt or even turned on one side, but also when the battery is turned completely upside down as may happen in an automobile accident or as a result of accidental mishandling during installation, removal or transit. Presently, this goal is accomplished by an expensive lead acid battery design utilizing gelled electrolytes, or by using AGM oxygen recombinant valve regulated (VRLA) batteries.

In accordance with this invention, the battery vent cover or manifold cover is designed to cooperate with a complementary or mating surface configurations on the battery casing lid to establish an electrolyte flowpath which substantially confines the liquid electrolyte to specific areas adjacent the cell opening, and which prevents lateral spillage into adjacent cells in all battery orientations with the exception of a complete inversion. Thus, the flowpath arrangement in accordance with the invention is effective for battery tilt orientations 90° in any direction, i.e., where the battery rests on any of its four peripheral sides. Spillage of the electrolyte out of the battery casing when the battery is inverted can be prevented by the use of a specially designed PTFE frit as described and claimed in commonly owned co-pending application Ser. No. 09/042,720, filed on Mar. 17, 1998, the entirety of which is incorporated herein by reference. While these two design features can be incorporated individually or in combination, the greatest benefit is achieved when they are combined in a single battery.

In one exemplary embodiment, a manifold vent cover is provided which is formed on its underside with ribs and walls which, in use, are heat sealed to mating, complementary ribs and walls on the upper surface of the battery casing cover or lid, and which together define substantially closed electrolyte flow paths for each cell. Since the flowpath for each cell is substantially identical, the description of one is sufficient. Part of the flowpath for each cell is defined by a hollow, cylindrical "chimney" formed in the battery casing cover and which extends below the underside thereof. In the area below the cover, the chimney is provided with vertically offset 180° ramps or baffles, in diametrically opposed relationship. The ramps are in fact, conical surfaces with central openings, i.e., each has a half circle cutout concentric with the longitudinal axis of the chimney. These ramps serve as splash guards and also facilitate drainage of splashed or spilled electrolyte back into the cell. The cooperative interfit of the splash tubes within the staggered ramps obviates the need for special "guides" inside the manifold cover which are notorious acid collectors and tend to accumulate beads of acid which will eventually find their way out of the cover.

At the same time, the underside of the manifold cover is formed with a plurality of downwardly extending splash guard tubes which are sized and located to extend into the chimneys on the battery cover. These tubes are open at their lower ends and closed by the manifold cover at their upper ends. The tube radius approximates the radius of the opening in the upper ramp so that, when the manifold cover is sealed to the battery cover, the tips of the tubes lie concentrically within the upper ramp. Thus, to escape the battery cover, any electrolyte from a given cell must follow a somewhat circuitous path around the lower ramp, upper ramp, and then upwardly around the splash tubes. In addition, the very nature of the double ramp arrangement provides splash protection by deflecting the electrolyte back into the cell.

On the upper side of the battery casing cover, vertical walls define a rectangular chamber around each chimney, each chamber having a pair of side walls and a pair of end walls. The chimney extends above the battery cover surface to the same extent as the chamber peripheral walls, and is open at the top. In addition, a circumferential gap is formed in the chimney wall so that, when the manifold cover is sealed to the battery cover, the vertically oriented. circumferential gap is the only opening by which electrolyte can escape the chimney and pass into the rectangular chamber between the battery casing lid and the manifold cover.

Within the rectangular chamber, there is also a wall tangential to the chimney, which extends to one of the chamber sidewalls. This tangential wall is substantially adjacent the circumferential gap in the chimney, and extends parallel to the chamber end walls, lying on the opposite side of the chimney from the nearest one of the end walls. As a result, any electrolyte passing through the circumferential gap must then pass around the outside of the chimney, approximately 180°, to enter the main area of the rectangular chamber.

It will be appreciated that the manifold cover has complementary or mating ribs so that the chamber for each cell is closed (including the upper end of the respective chimney), except as noted below, when the manifold cover is sealed to the battery casing cover.

The ribs on the underside of the manifold cover which define part of the sidewalls of the chamber each have a notch located between the end walls, permitting vapor to escape from any one or more of the cells to the vent ports at opposite ends of the manifold cover. Thus, under normal circumstances, vapor within the cells can escape by following a flowpath up through the chimneys and through the individual chambers in the manifold cover by means of the notches in the chamber sidewalls, and then passing through the vent ports containing the flame arrester frits. Should any splashing of electrolyte occur during use, the chimney and splash tube arrangement in conjunction with the chamber arrangement within the manifold cover will confine the electrolyte to the individual cells and will facilitate quick drainage of electrolyte back into the battery. In this connection, the "floor" of the chamber in the manifold cover is tilted back toward the cell opening.

As further described in detail hereinbelow, the flowpath arrangement will also confine the electrolyte within the individual cell chamber areas in the event the battery is tilted over onto any one of its four sides. In this regard, the vapor passage notches in the chamber side walls are located at strategic positions in the chamber side walls such that it is not likely that any electrolyte will reach those notches and pass between the adjacent chambers when the battery is tilted over. As already noted above, in order to insure complete spillage protection even if the battery is completely inverted, PTFE frits of the type disclosed in the '720 copending application can be utilized in combination with the novel electrolyte flowpath design as described hereinabove.

Accordingly, in its broader aspects, the present invention relates to a battery configuration including a casing having bottom, side and top surfaces, the top surface having a plurality of cell openings therein, an improved flowpath for liquid electrolyte when the battery is tilted onto any one of its side surfaces, the flowpath comprising a cover chamber for each cell opening defined by a substantially rectangular peripheral wall surrounding the cell opening; a cylindrical wall surrounding and substantially concentric with the cell opening and located within the substantially rectangular wall, the cylindrical wall interrupted by a relatively small circumferential gap; a wall extending between the cylindrical wall and an adjacent side of the peripheral wall, the wall tangential to the cylindrical wall and adjacent the gap.

Other objects and advantages of the present invention will become apparent from the detailed description which follows.

BRIEF DESCRIPTION OF THE DRAWINGS

FIG. 5 is a side elevation of the battery cover illustrated in FIG. 4;

FIG. 6 is a partial section of the cover shown in FIG. 5;

BEST MODE FOR CARRYING OUT THE INVENTION

Figure 1:
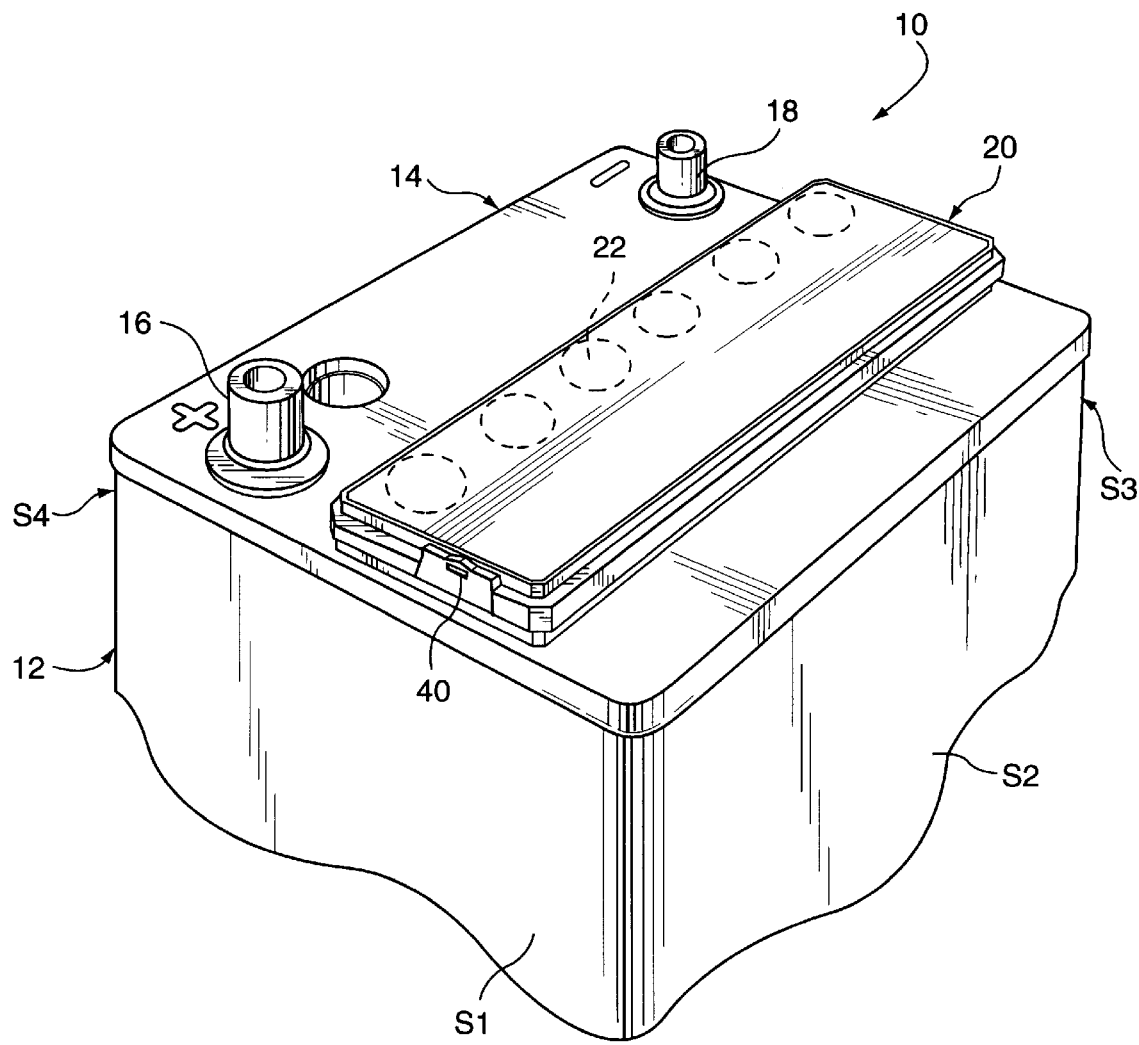
FIG. 1 is a perspective view of a battery incorporating a vent manifold cover in accordance with this invention.

With reference to FIG. 1, a maintenance-free battery 10 includes a casing 12 in which are located the individual cells and liquid electrolyte, and a cover or lid 14 which is typically heat sealed to the casing. Lead posts 16, 18 provide positive and negative terminals, respectively, which project from the cover and which are adapted to receive cable connections in a conventional manner. A manifold vent cover 20 overlies the cell openings 22 (shown in phantom in FIG. 1 but see also FIG. 2) formed in the cover. In maintenance free batteries, the manifold cover 20 is heat sealed to the battery cover 14, i.e., the manifold cover 20 is not intended to be removed during the useful life of the battery.

Figure 3:
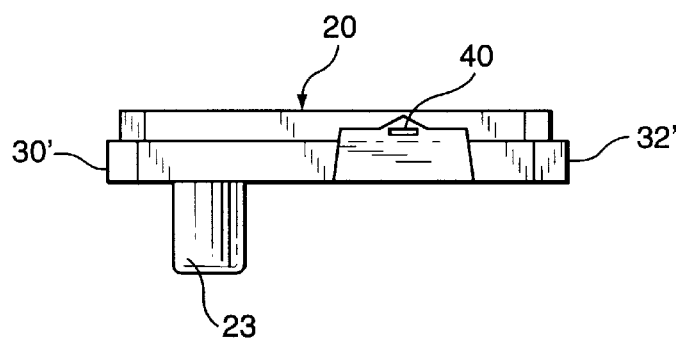
FIG. 3 is a side elevation of the manifold cover shown in FIGS. 1 and 2.
Figure 2:
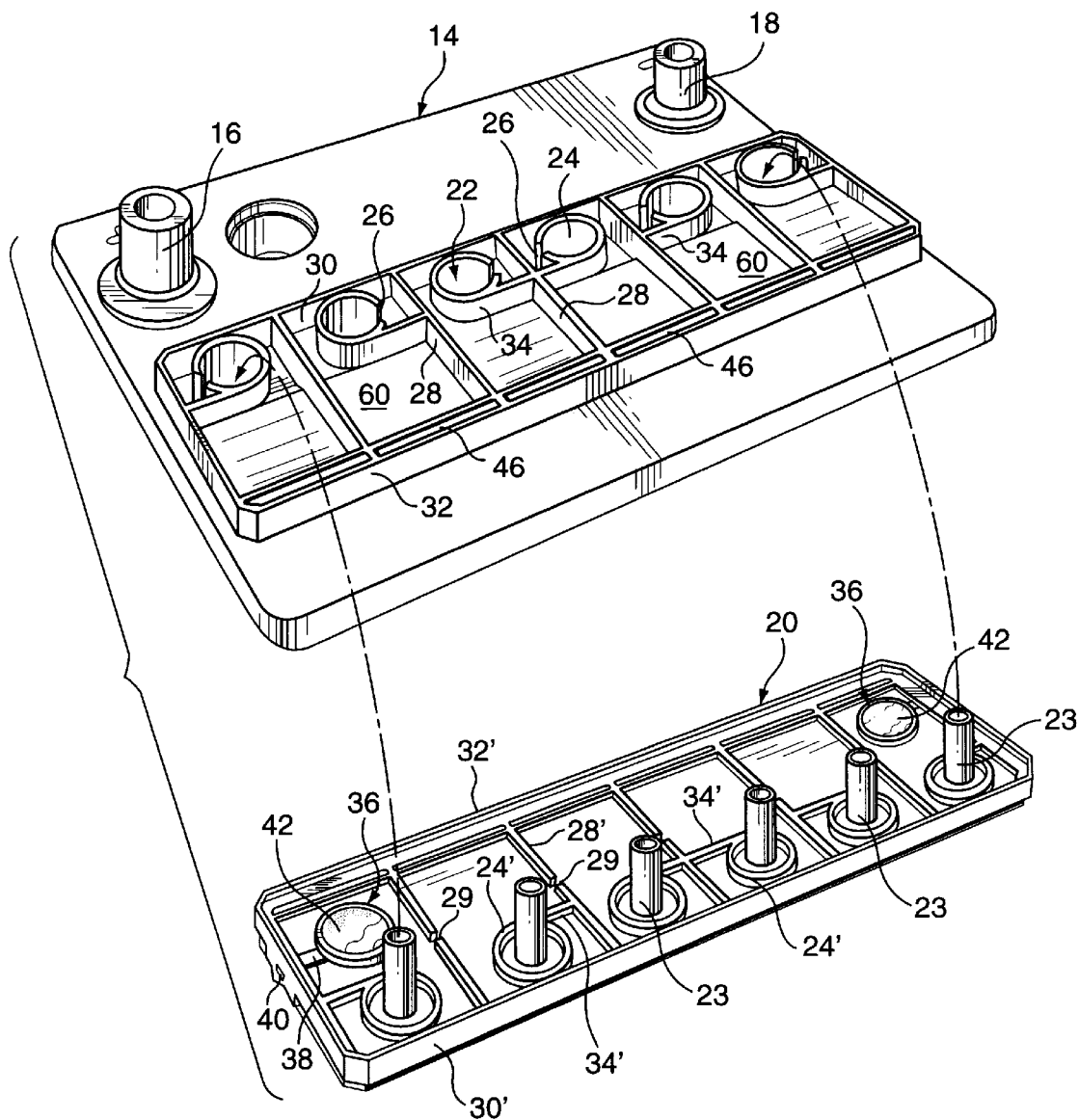
FIG. 2 is a perspective view of the battery cover removed from the battery shown in FIG. 1, and with the manifold cover removed from the battery cover.

With specific reference to FIGS. 2 and 3, the underside of the manifold cover 20 in accordance with this invention is formed with a plurality of hollow manifold or splash tubes 23 which extend down into the cell openings or chimneys 22 formed in the battery casing cover. As illustrated in FIG. 2, the chimneys 22 on the battery casing cover are defined in part by upstanding cylindrical walls 24, each discontinuous in the circumferential direction, thus providing a gap or notch 26 in the cylindrical wall. At the same time, each chimney is surrounded by a generally rectangular chamber area as defined primarily by upstanding, parallel ribs or walls 28 of equal height with walls 24, along with end walls 30, 32. Each of the chimney walls 24 is also connected to an adjacent wall 28 by a transverse wall section 34, also of equal height and tangent to the wall 24. Note that the transverse wall section 34 is parallel to the chamber end walls 30, 32, and that wall section 34 lies on the opposite side of the chimney from the nearest end wall 30. This arrangement, in cooperation with a similar arrangement on the underside of the manifold cover 20, establishes a desired flow pattern for the electrolyte in each cell, in the event of battery tilt or turn over. Thus, cylindrical walls 24' mate with similar walls 24; transverse wall sections 34' mate with similar sections 34; and ribs 28' mate with similar ribs 28 to form substantially closed chambers for each cell vent when the manifold is heat sealed to the battery casing cover. It is noted, however, that gaps 26 become closed-periphery apertures when the manifold 20 is sealed to the battery casing cover, and gaps 29 in the ribs 28' also form closed periphery openings in the combined ribs 28, 28'.

At the remote ends of the manifold cover 20, round vent recesses or ports 36 are integrally formed which are connected to atmosphere by passages 38 internal to the manifold. These passages open at slits 40 at opposite ends of the manifold cover 20. In these vent recesses or ports 36, porous PTFE discs or frits 42 may be located and sealed as described in commonly owned co-pending application Ser.

No. 09/042,720, filed Mar. 17, 1998. Alternatively, conventional polypropylene or other frits may be employed. Gaps or notches 29 in the walls 28' permit vapor to pass between the cells and eventually to the vent ports 36 and passages 38.

In this invention, the focus is on the electrolyte path which, by its configuration, prevents acid spillage when the battery is tilted to either side, front or back, even without the porous PTFE frits. Nevertheless, it is to be understood that PTFE frits may be used in combination with the novel electrolyte path not only to prevent spillage when the battery is tilted onto any of its four sides, but also to prevent spillage upon complete inversion of the battery, as described in the '720 application.

With specific reference to FIG. 2, the battery casing cover is also formed with cell vent slots 46, one for each of the cells. These vent slots permit air and/or vapor to escape during initial filling of the cells and before the manifold cover is sealed in place. They also provide a visual mechanism by which the electrolyte levels in each of the cells can be equalized. When the manifold cover is heat sealed in place, the slots are closed.

Figure 4:
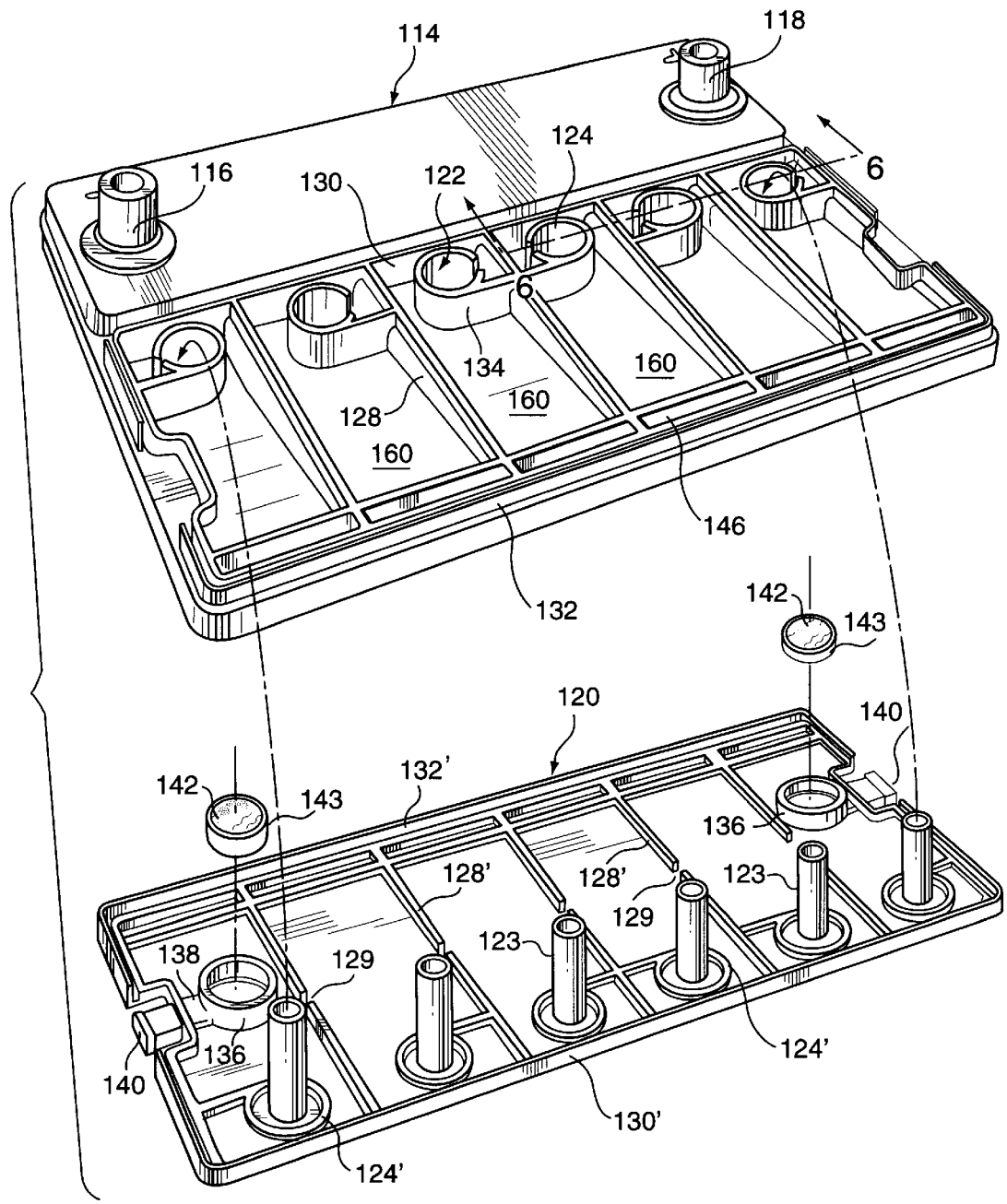
FIG. 4 is a perspective view similar to FIG. 2 but illustrating a recessed manifold cover in a flat battery cover arrangement.

FIG. 4 illustrates an alternative battery casing cover and manifold cover configuration where the battery cover design is such that the manifold cover, when in place, lies flush with the remaining upper surface portion of the battery cover in the area of terminals 116, 118. This is unlike the previously described embodiment shown in FIGS. 1–3 where the manifold cover projects above the battery casing cover. Otherwise, however, the electrolyte flowpath configuration and the arrangement of vent ports at opposite ends of the manifold cover are substantially identical and need not be described in detail. For convenience, similar reference numerals have been used to designate corresponding components but with the prefix "1" added in FIGS. 3 and 4.

Figure 6A:
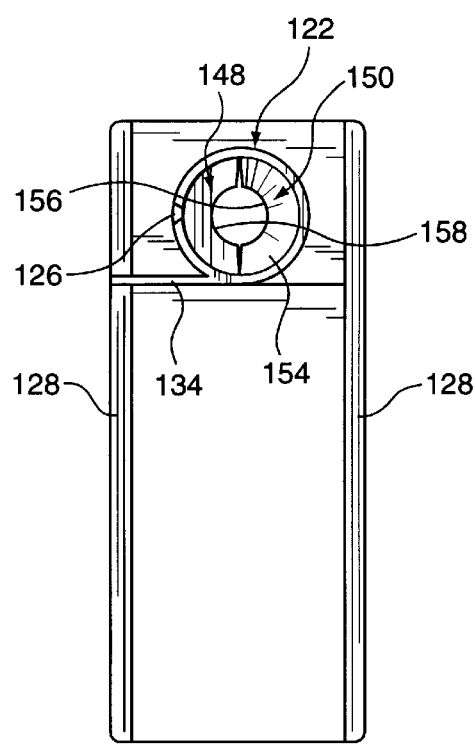
FIG. 6A is a partial plan view of the battery cover shown in FIGS. 4 and 5, showing a single cell chamber and cell opening.

With specific reference to FIGS. 5, 6 and 6A, the configuration of each chimney 122 is seen in greater detail. At the lower end of each substantially open cylindrical chimney, there are a pair of diametrically opposed baffles or "half moon" ramps 148, 150, each of which extends substantially 180°, but which are offset in a vertical direction. Each baffle has a tapered conical surface 152, 154, respectively, which extends radially inwardly toward the center axis of the chimney. Each baffle has a half circle cutout 156, 158 concentric with the center axis and of the same or different radius. These baffles or ramps provide a flow obstacle to liquid trying to escape a respective cell, but also promote splashback, and facilitate drainage of acid back into the cell without beading and accumulating due to the sharp angular drop of the baffles. Moreover, when tubes 123 are inserted into the openings 122, the ramps 148, 150 tend to "lock" in place, obviating the need for any additional interior guides.

Figure 7:
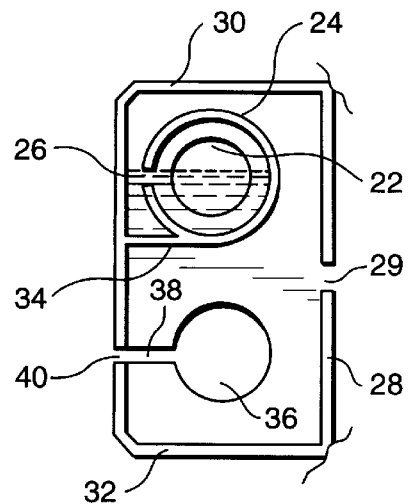
FIG. 7 illustrates schematically the electrolyte flowpath for one vent in a manifold cover in accordance with this invention when the battery is tilted onto a first of its four sides.

Turning now to FIGS. 7–10, the manner in which acid spillage is prevented for any given cell is shown substantially for 4 different tilt orientations, using the reference numerals found in FIG. 2 to indicate corresponding manifold and casing cover components, recognizing, of course that, in use, the manifold cover 20 is sealed to the battery casing cover 14 or lid. FIG. 7 shows cell cavity A within the cover 14, when the battery as shown in FIG. 1 is tilted onto side $S_2$ and with the liquid electrolyte stabilized. Electrolyte will flow out of the cell opening 22 and into the chamber defined by walls 28, 30, 32. Notice that electrolyte is free to flow through the gap 26 into an area outside the wall 24 but constrained by walls 28, 30. The electrolyte will simply seek its own level—approximately at the center of chimney 22, and will not spill into the remainder of the chamber. In this way, only vapor is free to transfer between chambers, via gaps or notches 29.

Figure 8:
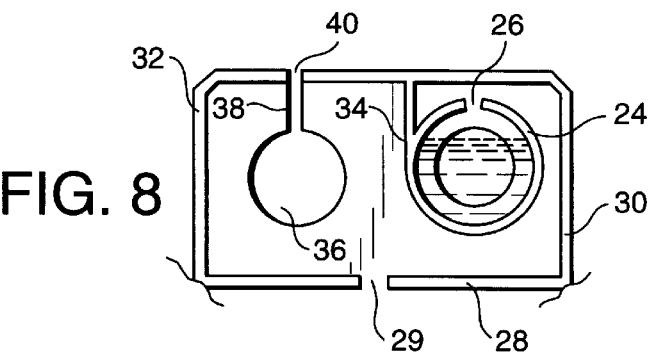
FIG. 8 is similar to FIG. 5 but illustrates the flowpath when the battery is tilted onto a second of its four sides.

FIG. 8 illustrates the cell orientation when the battery is tilted over onto side $S_3$. In this state, the electrolyte fills the cell opening, even above the center of the opening, but does not escape through the notch 26, and therefore remains confined within the cylindrical wall 24.

Figure 9:
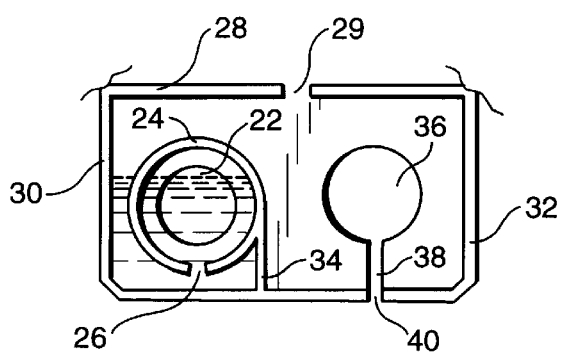
FIG. 9 is similar to FIG. 5 but illustrates the flowpath when the battery is tilted onto a third of its four sides.

FIG. 9 illustrates the battery tilted onto side $S_1$. In this orientation, electrolyte flows into the chamber and through the gap 26 into the area to the left of the wall 24, seeking its own level which is below the maximum height of the wall 24, so that the liquid does not flow into the chamber. Note that wall 34 prevents the electrolyte from escaping into the chamber area.

Figure 10:
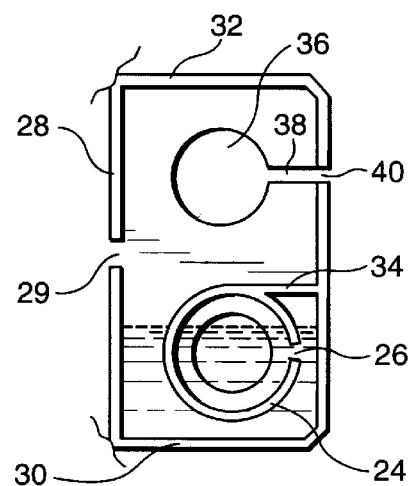
FIG. 10 is also similar to FIG. 5 but illustrates the flowpath when the battery is tilted onto a fourth of its four sides.

FIG. 10 illustrates the battery tilted onto side $S_4$. Here, the electrolyte flows into the chamber through the gap 26, seeking its own level which is just above the center of the vent opening but confined by the end wall and parallel wall 28. In each case, the electrolyte or acid is entrapped so that no electrolyte reaches the vent port 36 (and hence the frit), and no electrolyte passes through the appropriately located openings 29 into the adjacent cell area.

It will be appreciated that this same flow action takes place in each adjacent cell area, with the overall result that, one stabilized, no electrolyte escapes into adjacent cell compartments, and no electrolyte reaches the vent cell and frit arrangement. During the tilting action (prior to stabilization) or during severe vibration conditions, any splashing of electrolyte is inhibited by the baffles 148, 150 and even if escaping into chamber C, will quickly drain back into the chimney via slanted chamber floor 160, then down into the cell along the baffles. Finally, the chambers formed by the combined battery casing cover and manifold cover are purposefully designed to minimize sharp corners or angles where electrolyte will accumulate, with highly polished surfaces promoting drain back.

In the event of a complete inversion of the battery, no electrolyte would escape the battery casing as described in the co-pending '720 application. Thus, while the flowpath alone provides a high degree of tilt capability, the combined use of PTFE frits as described in the '720 application and the above described flowpath configuration provides even further benefits with regard to roll-over protection.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery including a casing having bottom, side and top surfaces, the top surface having a plurality of cell openings therein, and an improved flowpath for liquid electrolyte when the battery is tilted onto any one of its side surfaces, the flowpath comprising:
  a chamber for each cell opening defined by a substantially rectangular peripheral wall surrounding the cell opening; a cylindrical wall surrounding and substantially concentric with the cell opening and located within the substantially rectangular wall, said cylindrical wall interrupted by a gap; a wall extending between said cylindrical wall and an adjacent side of said peripheral wall, said wall tangential to said cylindrical wall and adjacent said gap.

2. The battery of claim 1 wherein said flowpath is formed by mating surfaces on said top surface of said casing and an underside of a manifold vent cover.

3. The battery of claim 2 wherein vapor escape ports are provided at opposite ends of said manifold vent cover.

4. The battery of claim 3 wherein said peripheral walls have openings therein remote from said cell openings to thereby permit vapor to escape said battery via said escape ports.

5. The battery of claim 3 wherein each cylindrical wall extends downwardly below said casing top surface, and wherein opposed baffles are located in the lower portion of the cylindrical wall.

6. The battery of claim 5 wherein each baffle extends substantially 180° and is tapered in a radial inward and downward direction.

7. The battery of claim 5 wherein said manifold vent cover has a plurality of tubular projections depending therefrom, each adapted to seat inside a respective one of said cylindrical walls.

8. The battery of claim 6 wherein each baffle is formed with a half circle cut-out concentric with a center axis of said cylindrical wall.

9. The battery of claim 3 wherein each vapor escape port has a flame arrester frit located therein.

10. The battery of claim 9 wherein said frit is made of porous polytetrafluoroethylene.

11. The battery of claim 2 and including means for venting air from said plurality of cells openings when liquid electrolyte is introduced into said cells before said manifold vent cover is sealed to said top surface of said casing.

12. The battery of claim 1 and including means for preventing escape of liquid electrolyte when the battery is inverted.

* * * * *